Dec. 17, 1957  F. E. BACHMAN ET AL  2,816,629
ROTOR BRAKE
Filed Dec. 18, 1953  4 Sheets-Sheet 2
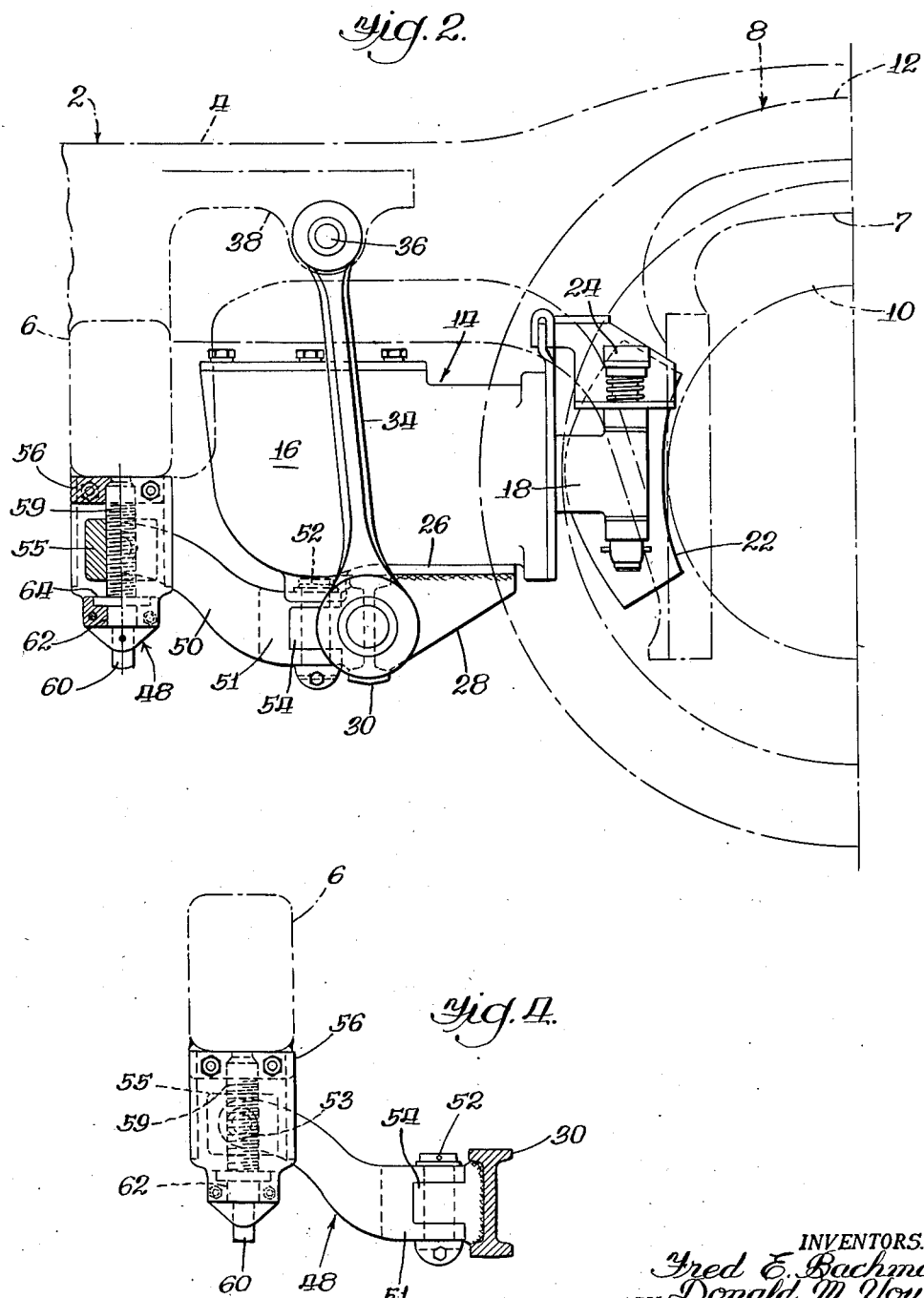
INVENTORS.
Fred E. Bachman
BY Donald M. Young Dec. 17, 1957 F. E. BACHMAN ET AL 2,816,629
ROTOR BRAKE
Filed Dec. 18, 1953 4 Sheets-Sheet 3
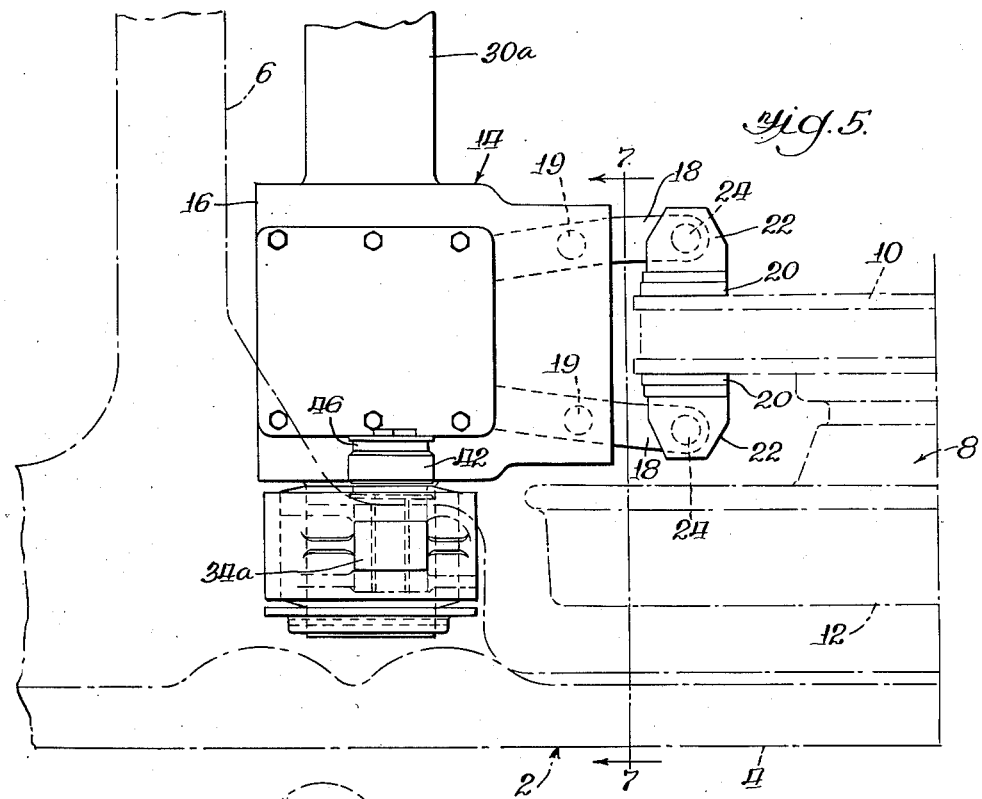
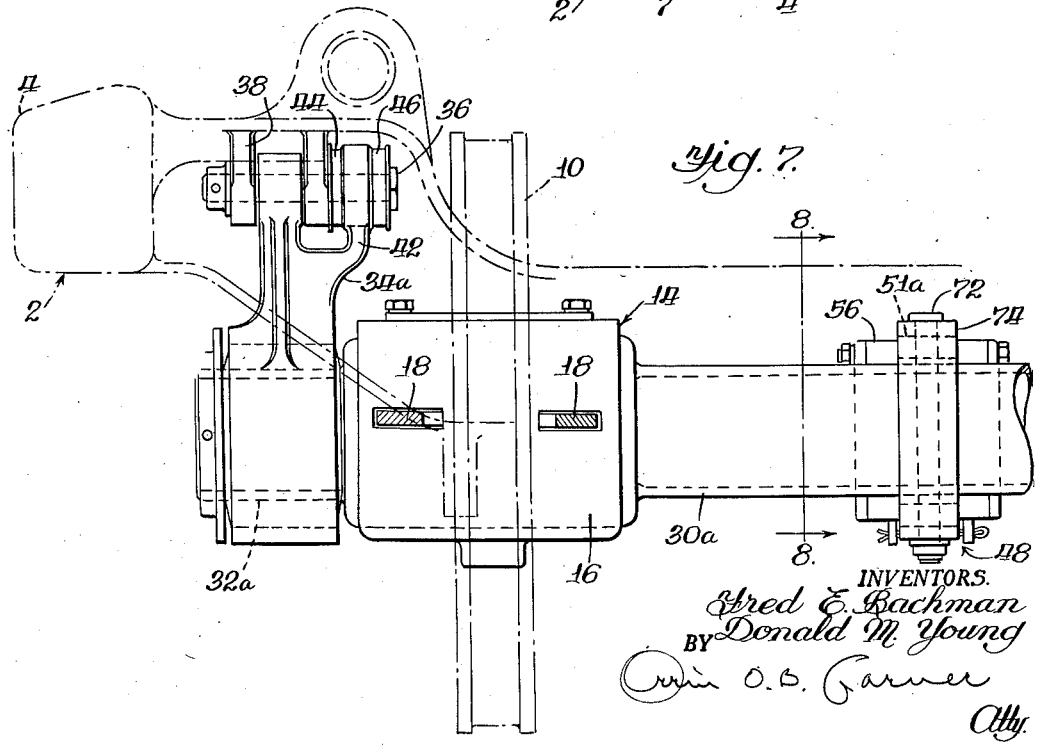
INVENTORS.
Fred E. Bachman
Donald M. Young
BY
Orvin O. B. Garner
Atty.

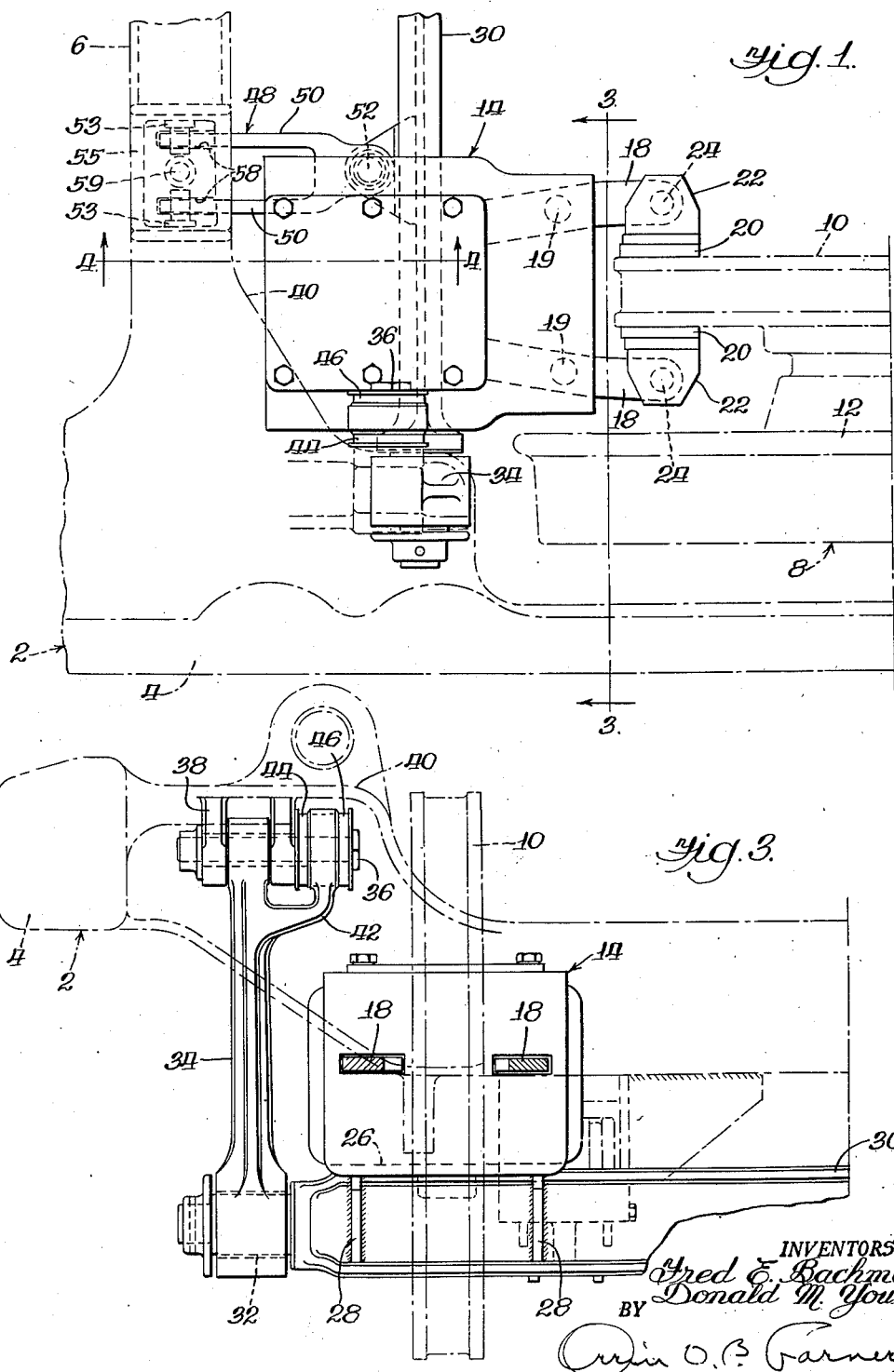

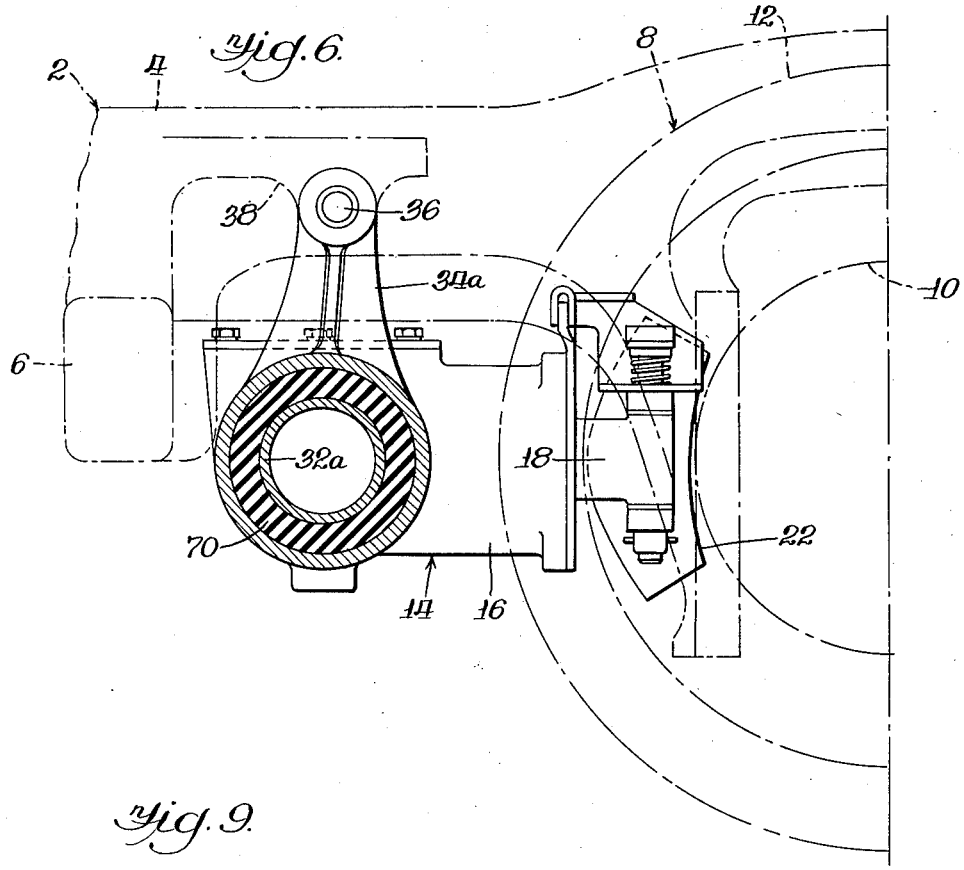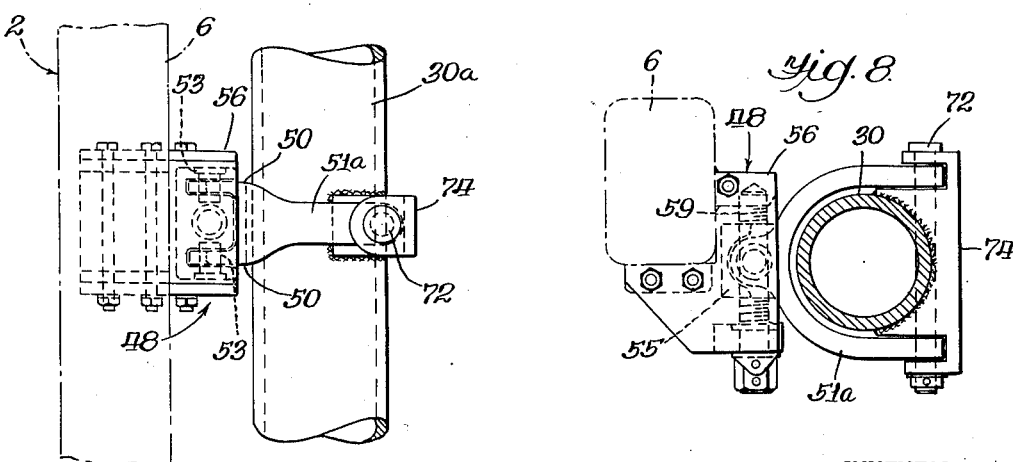

United States Patent Office 2,816,629
Patented Dec. 17, 1957

2,816,629
ROTOR BRAKE

Fred E. Bachman, St. Louis, and Donald M. Young, Elmdale Village, Mo., assignors to American Steel Foundries, Chicago, Ill., a corporation of New Jersey Application December 18, 1953, Serial No. 398,998

12 Claims. (Cl. 188—207)

This invention relates to railway brakes and more particularly to an off-tread brake wherein friction means are supported by the truck for frictional engagement with off-the-wheel-tread surfaces of the wheel and axle assemblies.

A primary object of the invention is to devise a novel brake support having means for adjusting the brake shoes relative to the associated friction surfaces of the wheel and axle assemblies.

Another object of the invention is to accommodate resiliently cushioned movements of the brake support laterally of the truck.

A more specific object of the invention is to support the brake mechanism on a beam extending transversely of the truck and pivotally mounted at its ends in hangers, the upper ends of which are pivotally connected to the truck frame and are provided with resilient means for cushioning movements of the beam endwise thereof laterally of the truck. The beam is provided with one or more torque arms pivoted thereto in order to accommodate such lateral movements of the beam, and each torque arm is afforded a novel connection to the truck frame for adjustably rotating the beam about its pivotal connections to the hangers and thereby adjusting the position of the brake shoes relative to the associated friction surfaces of the wheel and axle assembly.

The foregoing and other objects and advantages of the invention will become apparent from a consideration of the following specification and the accompanying drawings, wherein:

Figure 1 is a fragmentary top plan view of a railway car truck embodying the invention, approximately one quarter of the truck being illustrated inasmuch as it is symmetrical about its longitudinal and transverse center lines, Figure 2 is a side elevational view of the structure shown in Figure 1, Figure 3 is a sectional view on line 3—3 of Figure 1, Figure 4 is a sectional view through the brake beam taken on the line 4—4 of Figure 1 with the brake beam torque arm and associated adjusting device illustrated in elevation, Figure 5 is a fragmentary top plan view of a railway car truck embodying a modification of the invention, Figure 6 is a side elevational view, partly in vertical section, of the truck shown in Figure 5, Figure 7 is a sectional view on the line 7—7 of Figure 5, Figure 8 is a sectional view on the line 8—8 of Figure 7, and Figure 9 is a plan view taken from the top of Figure 8.

Describing the invention in detail and referring first to the embodiment thereof illustrated in Figures 1 to 4, the railway car truck illustrated therein comprises a conventional truck frame 2 having a side rail 4 at each side thereof, the side rails being spanned by transoms 6, only one of which is illustrated. The side rail 4 adjacent each end thereof is provided with a conventional jaw 7 (Figure 2) for the reception of a journal box (not shown) of a wheel and axle assembly 8 comprising a brake disk or rotor 10 attached to each wheel 12 of said assembly. It may be noted that only one wheel 12 and associated brake mechanism are illustrated inasmuch as the novel brake mechanism, as hereinafter described, is preferably associated with each wheel of the truck.

A brake device 14 is associated with each disk 10, said device preferably comprising a brake support in the form of a cylinder housing 16, such as that shown in United States Letters Patent No. 2,656,900. Brake levers 18 are pivoted as at 19 in said housing and are actuated by a conventional cylinder and piston device (not shown) therein to clamp brake shoes 20 against opposite sides of the disk 10. The shoes 20 are preferably mounted in any desired manner on brake heads 22 pivoted at 24 to the respective levers 18.

The housing 16 is supported at the bottom thereof by a flat plate 26 which may be integral therewith or may be fastened thereto in any desired manner as by welding. The underside of plate 26 is secured, as by welding, to spaced ribs 28 fastened to one side of a conventional brake beam 30 such as is commonly utilized to support wheel tread brake heads (not shown).

Each end of the beam 30 comprises a substantially cylindrical portion or trunnion 32 which is pivotally journalled in a complementary opening of the lower end of a hanger 34, the upper end of which is pivotally connected as by a bolt and nut assembly 36 within a bracket or jaw 38 formed on the underside of a gusset 40 at the juncture of side rail 4 and transom 6.

It may be noted that the bolt and nut assembly 36 also extends through a complementary opening of an arm 42 on the inboard side of the hanger 34, and rubber pads 44 and 46 are compressed by the bolt and nut assembly 36 against opposite sides of the arm 42 to cushion lateral swinging of the brake beam 30 due to endwise movement thereof relative to the truck frame 2. It may also be noted that the opposite end of the brake beam 30, not illustrated in the drawings, is similarly connected to the truck frame by a hanger 34 and is preferably provided with a brake device 14 associated with a brake disk at the opposite end of the wheel and axle assembly 8.

The above described lateral swinging of the beam 30 is also accommodated by a novel adjuster device 48 associated therewith for adjustably rotating the beam 30 on its trunnions 32 and thereby adjusting the position of the brake shoes 20 relative to the disk 10. The device 48 comprises torque arms 50 which are interconnected to define a jaw or yoke 51 pivoted on a substantially vertical axis as by a pin 52 to a lug 54 which is secured in any desired manner as by casting or welding on one side of the beam 30. The arms 50 are pivoted to an adjuster block 55 adajacent the free ends of said arms by pins 53. The block 55 is mounted for vertical adjustment within a casing or support 56 secured, as by welding, to the underside of the transom 6.

It will be noted, as best seen in Figure 1, that the free ends of the torque arms 50 are recessed as at 58 within the block 55 and that the heads of the pins 53 are countersunk in the block 55 and are held in assembled relationship by the inboard and outboard extremities of the casing 56. An adjuster screw 59 is threaded in the block 55, the upper end of said screw being journaled in a complementary opening of the casing 56, as best seen in Figure 4. The lower end of the screw 59 is provided with a wrench engaging portion 60 externally of the casing 56, and said portion 60 is connected to a cylindrical segment 62 of the screw 59. The segment 62 is rotatably journaled within a complementary opening of the casing 56 and is provided with a flange or fixed collar 64 rotatably seated against an upwardly facing surface of the casing 56.

Thus it will be understood that I have devised a novel rotor brake support wherein the cylinder housing 16 to which the levers 18 are fulcrumed is carried by a brake beam 30 which is rotatably journaled by its trunnions 32 within hangers 34 which accommodate and resiliently cushion (by means of the pads 44 and 46) endwise movements of the beam 30 laterally of the truck. The novel brake arrangement also comprises an adjuster device 48 operatively associated with the torque arms 50 for rotating the support structure for the levers 18 on a substantially horizontal axis to adjust the brake shoes 20 relative to the brake rotor or disk 10.

An important feature of the invention is the manner in which the torque arms 50 are pivoted at 52 to the brake beam 30 in such manner as to transmit braking torque therefrom and to accommodate the above described endwise movements of the brake beam 30 laterally of the truck. In this connection it will be noted that such cushioned movement of the brake beam 30 not only eliminates forces tending to fatigue the brake support structure comprising the beam 30 and hangers 34, but also accommodates relative lateral movement between the wheel and axle assembly 8 and the truck frame 2 during braking engagement of the shoes 20 with the disk 10.

A modification of the invention is illustrated in Figures 5 to 9, inclusive, wherein parts corresponding to those of the preceding embodiment are identified by corresponding numerals. In the modification of Figures 5 to 9, the brake beam 30a is similar in function to the beam 30 of the previously described embodiment, but is cast integral with the inboard sides of the cylinder housings 16, one of which is illustrated in Figure 5. For this reason the brake hangers 34a are provided with relatively large openings to receive the cylindrical end portions or trunnions 32a of the beam 30a which are resiliently bushed as at 70 (Figure 6) within the large openings of the hangers 34a. The hangers 34a are otherwise similar to those previously described in connection with the embodiment of Figures 1 to 6.

The large cross section of the brake beam 30a, as best seen in Figure 8, also requires an enlarged yoke or jaw 51a which, as in the previously described embodiment, is connected to the torque arms 50 associated with an adjuster device 48 substantially identical with that of the preceding embodiment. The yoke 51a is fulcrumed by a pin 72 extending through openings thereof and through aligned openings of a lug or block 74 secured in any desired manner as by welding to the brake beam 30a.

In this connection it may be noted that only one adjuster device 48 is illustrated in the drawings; however, any desired number of such devices may be utilized as will be readily understood by those skilled in the art.

The modification of Figures 5 to 9 is otherwise identical with that described in connection with Figures 1 to 4 and as above noted, the corresponding parts are identified with corresponding numerals.

We claim:

1. In a brake arrangement for a railway car truck having a truck frame and a supporting wheel and axle assembly, the combination of a brake beam extending lengthwise thereof transversely of the truck and having substantially cylindrical end portions, brake hangers pivotally connected at their upper ends to the truck frame and having openings receiving the respective end portions, resilient means associated with the frame and hangers for cushioning endwise movements of the beam laterally of the truck, a brake support member supported by the beam, brake levers fulcrumed to said member, brake shoes operatively associated with said levers for actuation thereby to engage brake surfaces of said assembly, and means for adjusting the position of said shoes relative to said surfaces comprising a torque arm pivoted on a substantially vertical axis to the beam, a block pivoted to the arm on a substantially horizontal axis, and means rotatably mounted on the truck frame and threaded into the block for adjusting the latter upwardly and downwardly and thereby effecting corresponding adjustment of the shoes.

2. In a brake arrangement for a railway car truck having a truck frame and a supporting wheel and axle assembly, the combination of a brake beam extending lengthwise thereof transversely of the truck, brake hangers pivoted to the truck frame, said beam having substantially cylindrical end portions journaled in respective hangers, resilient means for cushioning movements of the beam endwise thereof, said means comprising resilient pads positioned on opposed sides of the hanger, a brake support carried by the beam, brake levers fulcrumed to said support on substantially vertical axes, and a torque arm having one end pivoted to the beam on a substantially vertical axis and having its other end pivoted to the frame on a horizontal axis extending in a direction normal to the longitudinal axis of the torque arm and parallel to the longitudinal axis of the beam.

3. In a brake arrangement for a railway car truck having a truck frame and a supporting wheel and axle assembly; the combination of means for braking said assembly, a brake beam supporting said means and extending transversely of the truck, hangers pivotally supporting the ends of the beam, the upper end of each hanger being received within a jaw of the truck frame, an arm on each hanger aligned with the related jaw, a bolt and nut assembly extending through each hanger and its arm and pivotally connecting the hanger to the related jaw, and resilient means compressed by said bolt and nut assembly against opposite sides of the arm, one of said resilient means being compressed between the arm and jaw and the other of said resilient means being compressed between the arm and one end of the bolt and nut assembly, said resilient means cushioning movements of the beam endwise thereof, a torque arm having a pivotal torque connection to the beam on a substantially vertical axis to accommodate such endwise movement of the beam, and means for adjusting the position of said braking means relative to the wheel and axle assembly comprising means carried by the truck frame for adjustably moving the torque arm upwardly and downwardly at the end thereof remote from said beam.

4. A brake arrangement according to claim 3, wherein the means for adjustably moving the torque arm are characterized by a casing carried by the truck frame, an adjuster screw rotatably mounted in the casing, a block in threaded engagement with the adjuster screw, and a pivotal connection on a substantially horizontal axis between the block and the torque arm.

5. A brake arrangement according to claim 3, wherein the brake beam is of I-section and is pivotally connected to the torque arm at the side of said beam remote from the wheel and axle assembly.

6. A brake arrangement according to claim 3, wherein the brake beam is substantially cylindrical in cross section from end to end thereof and is pivotally connected to the torque arm at the side of said beam adjacent the wheel and axle assembly.

7. A brake arrangement according to claim 6, wherein the ends of the beam are received within openings of the hangers to afford pivotal connection thereto, and wherein resilient bushings in said openings surround the beam ends.

8. In a brake arrangement for a railway car truck having a truck frame and a supporting wheel and axle assembly; the combination of a brake surface on said assembly, a beam extending transversely of the truck approximately parallel to said assembly, hangers pivoted at their upper ends to said frame and pivoted at their lower ends to the ends of said beam, means carried by said beam for braking said surface, and a torque arm having one end pivoted to the beam with a vertical axis fixed with respect to the frame and having the other end pivoted on a horizontal axis vertically movable with respect to the frame.

9. In a brake arrangement for a railway car truck having a truck frame and a supporting wheel and axle assembly; the combination for means for braking said assembly, a beam supporting said means, said beam extending lengthwise thereof transversely of the truck, hangers pivoted to the frame and to the beam for supporting the latter and accommodating endwise movement thereof relative to the frame, a vertically adjustable horizontal pivot secured to the frame, a torque arm having one end connected to said pivot and having the other end pivotally connected to the beam on a substantially vertical axis for adjustably pivoting the beam relative to the hanger and for transmitting braking torque from the beam to the frame, the axis of said pivot extending in a direction normal to the longitudinal axis of the torque arm and parallel to the longitudinal axis of the beam, and means for cushioning endwise movements of the beam.

10. In a brake arrangement for a railway car truck having a truck structure and a supporting wheel and axle assembly; the combination of a brake beam extending lengthwise thereof transversely of the truck, the ends of said beam being free of direct connection to the truck means pivotally suspending the beam at its ends from said structure for rotation relative thereto on a substantially horizontal axis, vertically adjustable means disposed adjacent said first mentioned means and interconnecting the structure and beam for adjustably rotating the latter on said axis, and brake means carried by said beam for engagement with a friction surface of said assembly.

11. In a brake arrangement for a railway car truck; the combination of a floating brake beam extending lengthwise thereof transversely of the truck, means carried by said beam for braking the truck, means pivotally suspending the beam from the truck on a substantially horizontal axis, said suspension means accommodating limited cushioned lengthwise movement of the beam transversely of the truck, and vertically adjustable means connected to the beam and truck for adjustably rotating the beam on said axis to adjust the vertical position of the braking means.

12. In a brake arrangement for a railway car truck having a truck frame and a supporting wheel and axle assembly; the combination of a brake beam extending lengthwise thereof transversely of the truck and having end portions, brake hangers interconnecting the truck and the respective end portions, resilient means associated with the frame and hangers for cushioning endwise movement of the beam transversely of the truck, a brake support member supported by the beam, brake levers fulcrumed to said member, brake shoes operatively associated with said levers for actuation thereby to engage brake surfaces of said assembly, and means for adjusting the position of said shoes relative to said surfaces, said means comprising a torque arm pivoted on a substantially vertical axis to the beam, a block pivoted to the arm on a substantially horizontal axis, and means mounted on the truck frame in association with the block for adjusting the latter vertically and thereby affecting corresponding adjustment of the shoes.

References Cited in the file of this patent

UNITED STATES PATENTS

| | | |
|---|---|---|
| 2,377,190 | Tack | May 29, 1945 |
| 2,416,869 | Eksergian | Mar. 4, 1947 |
| 2,481,127 | Ledwinka | Sept. 6, 1949 |
| 2,568,704 | Baselt | Sept. 25, 1951 |
| 2,655,226 | Tack et al. | Oct. 13, 1953 |
| 2,673,623 | Coombes | Mar. 30, 1954 |